US012634147B2

(12) United States Patent
Farrell et al.

(10) Patent No.: US 12,634,147 B2
(45) Date of Patent: May 19, 2026

(54) SECURE MESSAGE SYSTEM AND METHOD OF THE SAME

(71) Applicant: GM Global Technology Operations LLC, Detroit, MI (US)

(72) Inventors: Brian Farrell, Troy, MI (US); Sherif Aly, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 27 days.

(21) Appl. No.: 18/799,334

(22) Filed: Aug. 9, 2024

(65) Prior Publication Data

US 2026/0046139 A1     Feb. 12, 2026

(51) Int. Cl.
| | |
|---|---|
| *H04L 9/32* | (2006.01) |
| *H04L 69/22* | (2022.01) |
| *H04W 48/08* | (2009.01) |

(52) U.S. Cl.
CPC ............ *H04L 9/3242* (2013.01); *H04L 69/22* (2013.01); *H04W 48/08* (2013.01)

(58) Field of Classification Search
None
See application file for complete search history.

(56) References Cited

U.S. PATENT DOCUMENTS

| | | | | |
|---|---|---|---|---|
| 11,765,256 B2 * | 9/2023 | Weber | ................... | H04L 69/329 370/392 |
| 2006/0047771 A1 * | 3/2006 | Blackmore | ............. | H04L 67/12 709/209 |
| 2007/0174171 A1 * | 7/2007 | Sheffield | ................ | G06Q 40/04 705/37 |

(Continued)

FOREIGN PATENT DOCUMENTS

| | | | | |
|---|---|---|---|---|
| CN | 109309689 B | * | 4/2019 | ........... H04L 63/123 |
| CN | 116489209 A | * | 7/2023 | ............. H04L 67/30 |

(Continued)

OTHER PUBLICATIONS

Farrell et al. "Securing In-Vehicle Service Oriented Architecture with MAC Generate Allow List Enforcement in Host Device", U.S. Appl. No. 18/459,603, filed Sep. 1, 2023.

Farrell et al. "Securing In-Vehicle Service Oriented Architecture with MAC Generate Allow List ", U.S. Appl. No. 18/073,540, filed Dec. 1, 2023.

(Continued)

*Primary Examiner* — Ali H. Cheema

(74) *Attorney, Agent, or Firm* — Honigman LLP; Matthew H. Szalach; Jonathan P. O'Brien

(57) ABSTRACT

A computer-implemented method that causes data processing hardware to perform operations including generating, at a first device, a message having a header including a message type and a service ID, receiving, at a second device, the message including the header and a key serial number (KSN) of the first device, determining, based on the header, the message type of the message, verifying, at a high performance crypto accelerator (HPCA) of the second device, a message authentication code (MAC) of the message based on the determined message type being the service event, obtaining, based on the KSN from the message, a key slot from a message authentication code table (MACT), identifying, based on the key slot, a key associated with the key slot obtained from the MACT, the key including at least one of a primary key and a secondary key, and verifying, using the key and the key slot obtained from the MACT, the MAC.

18 Claims, 9 Drawing Sheets

(56) References Cited

U.S. PATENT DOCUMENTS

| | | | | |
|---|---|---|---|---|
| 2008/0279381 A1* | 11/2008 | Narendra | ............. | H04L 9/0891 |
| | | | | 380/270 |
| 2010/0118771 A1* | 5/2010 | Lee | .................... | H04W 36/005 |
| | | | | 370/328 |
| 2016/0205222 A1* | 7/2016 | Shaffer | ................ | H04L 69/085 |
| | | | | 709/230 |
| 2018/0167216 A1* | 6/2018 | Walrant | ............... | H04L 9/0894 |
| 2024/0187401 A1* | 6/2024 | Farrell | .................. | H04L 63/083 |

FOREIGN PATENT DOCUMENTS

| | | | | | |
|---|---|---|---|---|---|
| DE | 102023120351 A1 | | 6/2024 | | |
| JP | 2016057672 A | * | 4/2016 | | |
| WO | WO-2022242775 A1 | * | 11/2022 | ............. | H04L 47/34 |

OTHER PUBLICATIONS

Farrell et al. "Method To Secure In-Vehicle Service Oriented Architecture With Message Authentication Code (MAC) Generate Allow List (MGAL) ", U.S. Appl. No. 18/420,086, filed Jan. 23, 2024.

* cited by examiner

10

12, 12a-n

16

12,
12a-n

Service-Oriented Architecture 14

Controller 20, 20a-n

Data Processing Hardware 18, 18a-n

Secure Environment 100, 100a-n

Secret Keys 102, 102a-n

Primary Key 104, 104a-n

Secondary Key 106, 106a-n

MAC Generate Allow List (MGAL) 112

MAC Table (MACT) 60

80    84

Key Slot Number Field 72

Key Slot 70

34, 34a-n 44, 44a-n

Message 30, 30a-n

Header 40

Message Type 42

Service Discovery 46

Remote Procedure Call (RPC) 48

Service Event 50

Service Identifier (ID) 44, 44a-n

Message Authentication Code (MAC) 32, 32a-n

Key Serial Number (KSN) 34, 34a-n

Services 24

Key Derivation Function 64

KSN/Service ID Table 82

Memory Hardware 22, 22a-n

FIG. 2

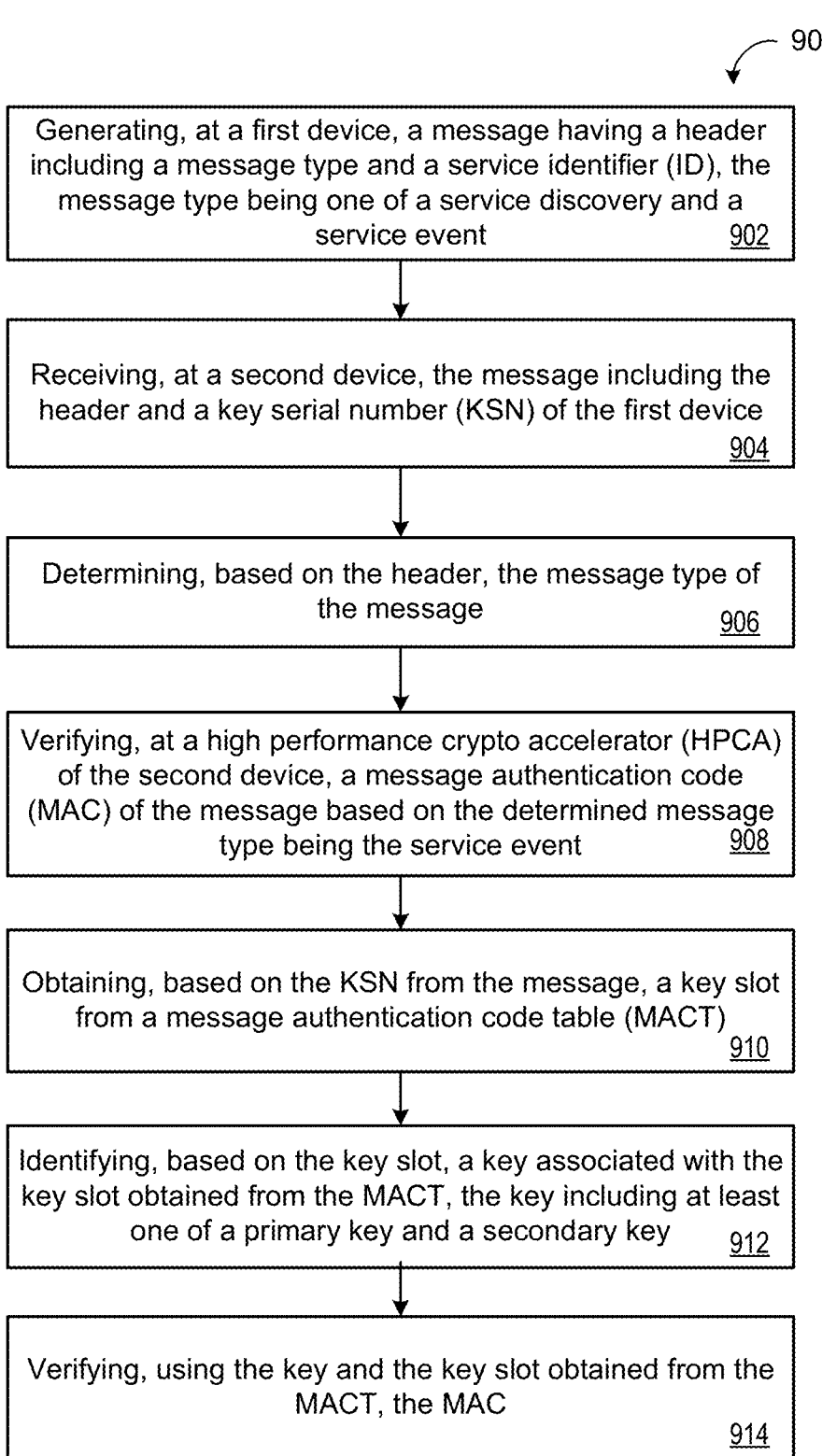

900

Generating, at a first device, a message having a header including a message type and a service identifier (ID), the message type being one of a service discovery and a service event        902

Receiving, at a second device, the message including the header and a key serial number (KSN) of the first device        904

Determining, based on the header, the message type of the message        906

Verifying, at a high performance crypto accelerator (HPCA) of the second device, a message authentication code (MAC) of the message based on the determined message type being the service event        908

Obtaining, based on the KSN from the message, a key slot from a message authentication code table (MACT)        910

Identifying, based on the key slot, a key associated with the key slot obtained from the MACT, the key including at least one of a primary key and a secondary key        912

Verifying, using the key and the key slot obtained from the MACT, the MAC        914

FIG. 9

SECURE MESSAGE SYSTEM AND METHOD OF THE SAME

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a secure message system and method of the same, and more particularly to a secure message system for devices of a vehicle.

Modern vehicles have seen rapid technological advancements in the number of electronics and associated software included within the vehicle. For example, electronic control units (ECUs) are used as embedded systems within the vehicle that control various electromechanical systems. However, within a service-oriented architecture (SOA), and without proper security, ECUs are susceptible to spoofing by an imposter or compromised ECU. To address this, systems may include a message authentication code (MAC) generate allow list (MGAL) to determine whether a MAC may be generated over a message to be transmitted by an ECU. Without a valid MAC, receiving ECUs will reject the transmitted message.

SUMMARY

In some aspects, a computer-implemented method when executed by data processing hardware causes the data processing hardware to perform operations. The operations include generating, at a first device, a message having a header including a message type and a service identifier (ID), the message type being one of a service discovery and a service event, receiving, at a second device, the message including the header and a key serial number (KSN) of the first device, and determining, based on the header, the message type of the message. The operations also include verifying, at a high performance crypto accelerator (HPCA) of the second device, a message authentication code (MAC) of the message based on the determined message type being the service event, obtaining, based on the KSN from the message, a key slot from a message authentication code table (MACT), identifying, based on the key slot, a key associated with the key slot obtained from the MACT, the key including at least one of a primary key and a secondary key, and verifying, using the key and the key slot obtained from the MACT, the MAC.

In some examples, determining the message type may include determining that the message type is a service discovery. Optionally, the operations may include receiving, at a secure environment of the second device, the message and generating, outside of a secure environment of the first device, a KSN/service ID table including storing the KSN and the service ID from the message. In some instances, generating the KSN/service ID table may include associating an offered service of the message with the KSN of the second device. Optionally, verifying the MAC may include determining an error based on the KSN from the message and the stored service ID at the KSN/service ID table. In other examples, determining the error may include issuing an error message and terminating the service event. In other examples, identifying the key may include executing a key derivation function and generating the secondary key.

In another aspect, a computer-implemented method when executed by data processing hardware causes the data processing hardware to perform operations. The operations generating, at a first device, a message having a header including a message type and a service identifier (ID), the message type being one of a service discovery and a service event, receiving, at a second device, the message including the header and a key serial number (KSN) of the first device, determining, based on the header, the message type of the message, and bypassing, based on the determined message type being the service event, a message authentication code (MAC) generate allow list (MGAL). The operations also include comparing, based on the KSN from the message, the service ID from the message with a stored service ID from a message authentication code table (MACT), validating, based on the service ID matching the stored service ID, the KSN at the MACT, and obtaining, based on the validated KSN, a key slot from the MACT. The operations further include identifying, based on the key slot, a key associated with the key slot obtained from the MACT, the key including at least one of a primary key and a secondary key and verifying, using the key and the key slot obtained from the MACT, the MAC.

In some examples, determining the message type may include determining that the message type is a service discovery. Optionally, the operations may include receiving, at a secure environment of the second device, the message and generating, outside of a secure environment of the first device, a KSN/service ID table including storing the KSN and the service ID from the message. In further instances generating the KSN/service ID table may include associating an offered service of the message with the KSN of the second device. In other examples, verifying the MAC may include determining an error based on the KSN from the message and the stored service ID at the KSN/service ID table and issuing an error message and terminating the service event. Optionally, bypassing the MGAL may include verifying, by a high performance crypto accelerator (HPCA), the service event. In further examples, identifying the key may include executing a key derivation function and generating the secondary key.

In further aspects, a secure message system for a vehicle includes data processing hardware and memory hardware in communication with the data processing hardware. The memory hardware stores instructions that when executed on the data processing hardware cause the data processing hardware to perform operations. The operations include generating, at a first device, a message having a header including a message type and a service identifier (ID), the message type being one of a service discovery and a service event, receiving, at a second device, the message including the header and a key serial number (KSN) of the first device, and determining, based on the header, the message type of the message. The operations also include verifying, at a high performance crypto accelerator (HPCA) of the second device, a message authentication code (MAC) of the message based on the determined message type being the service event, obtaining, based on the KSN from the message, a key slot from a message authentication code table (MACT), identifying, based on the key slot, a key associated with the key slot obtained from the MACT, the key including at least one of a primary key and a secondary key, and verifying, using the key and the key slot obtained from the MACT, the message authentication code (MAC).

In some examples, determining the message type may include determining that the message type is a service discovery. Optionally, the operations may include receiving, at a secure environment of the second device, the message and generating, outside of a secure environment of the first device, a KSN/service ID table including storing the KSN and the service ID from the message. In some instances, generating the KSN/service ID table may include associating an offered service of the message with the KSN of the second device. In other instances, verifying the MAC may include determining an error based on the KSN from the message and the stored service ID at the KSN/service ID table. Optionally, determining the error may include issuing an error message and terminating the service event.

BRIEF DESCRIPTION OF THE DRAWINGS

The drawings described herein are for illustrative purposes only of selected configurations and are not intended to limit the scope of the present disclosure.

FIG. 2 is an exemplary block diagram of a secure message system according to the present disclosure;

FIG. 9 is a flow diagram of a method of operation of the secure message system.

Corresponding reference numerals indicate corresponding parts throughout the drawings.

DETAILED DESCRIPTION

Figure 1:
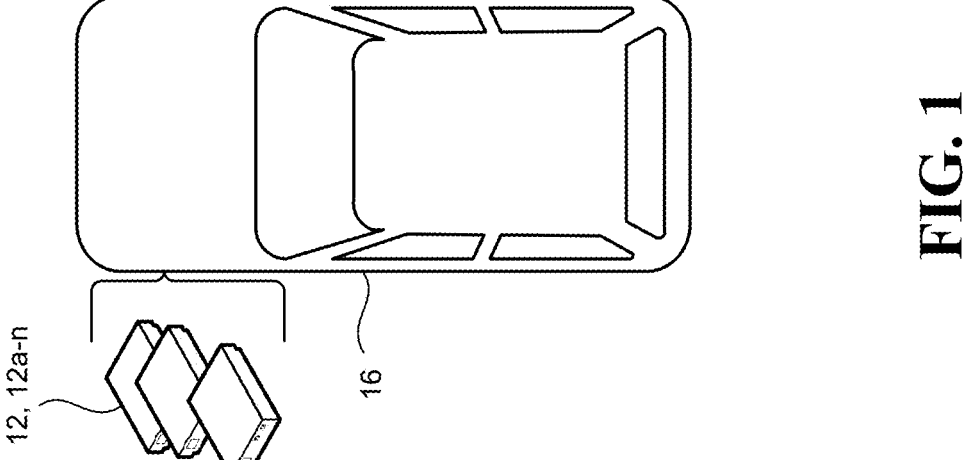
FIG. 1 is a schematic of a vehicle equipped with a plurality of devices configured with a secure message system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIGS. 1 and 2, a secure message system 10 includes and interconnects a plurality of devices 12, 12a-n implementing a service-oriented architecture 14. In some examples, the devices 12, 12a-n may be configured as part of a vehicle 16, such that the various devices 12, 12a-n may be communicatively coupled via the secure message system 10 within the vehicle 16. The service-oriented architecture 14 is configured on data processing hardware 18, 18a-n of a controller 20, 20a-n of each device 12, 12a-n. The controller 20, 20a-n also includes memory hardware 22, 22a-n that is configured to store instructions that, when executed on the data processing hardware 18, 18a-n, cause the data processing hardware 18, 18a-n to perform operations corresponding to the service-oriented architecture 14.

Notably, and as will be described in further detail below, each of the devices 12, 12a-n performs respective operations, where each device 12, 12a-n may perform multiple operations with distinct criticalities, and may operate as both a transmitting device 12, 12a-n and a receiving device 12, 12a-n. For example, a receiving device 12, 12a-n may include a brake controller that has multiple operations including a low criticality operation such as clearing a brake status indicator, and a high criticality operation such as applying the brakes. In this example, the transmitting device 12, 12*a-n* may have permission to request a transmission to the receiving device 12, 12*a-n* for the low criticality operation (e.g., clearing a status indicator), but the transmitting device 12, 12*a-n* may not have permission to request a transmission to the receiving device 12, 12*a-n* for the high criticality operation (i.e., applying the brakes). By defining permissions at the operations level, the secure message system 10 follows a principle of least privilege where a device 12, 12*a-n* is only given access to the level of operations it truly needs for a particular device 12, 12*a-n*.

In the example shown, the device 12, 12*a-n* executing the secure message system 10 is disposed within the vehicle 16. However, the secure message system 10 can be implemented on other devices (e.g., computing devices in communication with the device 12, 12*a-n*), such as, without limitation, a smart phone, tablet, smart display, or a vehicle infotainment device. The device 12, 12*a-n* may communicate with each of the other devices 12, 12*a-n* using standard communications technologies and/or protocols. Thus, a network can be in communication with the devices 12, 12*a-n* and can include Wireless Fidelity (WiFi®) (e.g., 802.11), worldwide interoperability for microwave access (WiMAX), 3G, 4G, Long Term Evolution (LTE), 5G, digital subscriber line (DSL), Bluetooth®, Near Field Communication (NFC), or any other wireless standards. The vehicle 16 may include one or more access points (AP) (not shown) configured to facilitate wireless communication between the device 12, 12*a-n* and one or more of the other devices 12, 12*a-n*.

Referring still to FIGS. 1 and 2, the devices 12, 12*a-n* are configured to exchange messages 30, 30*a-n* corresponding to different services 24 associated with each respective device 12, 12*a-n*. Each device 12, 12*a-n* is also able to create a message authentication code (MAC) 32, 32*a-n* that is generated over the messages 30, 30*a-n* sent by the devices 12, 12*a-n* using a secret key 102,102*a-n*. Each device 12, 12*a-n* is provisioned with a secret key 102, 102*a-n*, which is used to generate MACs 32, 32*a-n* over the messages 30, 30*a-n* that are sent to other devices 12, 12*a-n*, as described herein. Each device 12, 12*a-n* further includes a key serial number (KSN) 34, 34*a-n* that is unique to the respective device 12, 12*a-n*. For example, the KSN 34, 34*a-n* may be based on an internet protocol (IP) address of the respective device 12, 12*a-n* upon initial configuration of the device 12, 12*a-n*.

The message 30, 30*a-n* may be a service offer from one device 12, 12*a-n* to another device 12, 12*a-n*. The message 30, 30*a-n* has a header 40 that includes a message type 42 and a service identifier (ID) 44, 44*a-n*. In some instances, the service ID 44, 44*a-n* indicates that the message type 42 is a service discovery 46. In non-service discovery examples, the header 40 contains the message type 40, the service ID 44, and either a method ID or remote procedure call (RPC) ID 48 or a service event ID 50. Thus, the header 40 generally includes one of a service discovery 46, a method RPC 48, and a service event 50. The method described herein with respect to the service discovery 46 is generally the same for the RPC 48, such that the method described with respect to the service discovery 46 may be applied to the RPC 48. After completion of service discovery 48, the service ID 44, 44*a-n* is associated with the KSN 34, 34*a-n* of the device 12, 12*a-n* that is sending the message 30, as described in more detail below. Each device 12, 12*a-n* is preconfigured with a message authentication code table (MACT) 60. During service discovery 46, the MACT 60 ties the KSN 34, 34*a-n* to a particular key slot 70, which holds the key 102, 102*a-n* of the device 12, 12*a-n* associated with the KSN 34, 34*a-n*. The MACT 60 may also be utilized to link headers 40 with key slots 70 for messages 30, 30*a-n* that are distinct from service discovery 46. For example, messages 30, 30*a-n* that are statically defined to come from the same device 12, 12*a-n* may have a respective header 40 of a message 30, 30*a-n* linked with a key slot 70.

Referring now to FIGS. 2-7, the controller 20, 20*a-n* of the device 12, 12*a-n* includes a secure environment 100, 100*a-n*, described below. The secure environment 100, 100*a-n* may be a hardware security module. The secure environment 1000, 100*a-n* may be configured as a portion of the data processing hardware 18, 18*a-n* and/or external to the controller 20, 20*a-n*. Thus, the secure environment 100, 100*a-n* is securely insulated from direct, external communication or actions, which minimizes the potential of compromising the secure environment 100, 100*a-n*. For example, the secure environment 100, 100*a-n* stores secret keys 102, 102*a-n* that are associated with the respective device 12, 12*a-n*. The secret keys 102, 102*a-n* are protected by the secured isolation of the secure environment 100, 100*a-n*. Thus, the secure environment 100, 100*a-n* is protected against potential compromise events that may otherwise affect the service-oriented architecture 14, described in more detail below.

The secret keys 102, 102*a-n* of the secure environment 100, 100*a-n* include a primary key 104, 104*a-n* and a secondary key 106, 106*a-n*, which is derived from the primary key 104, 104*a-n*. For example, the secure environment 100, 100*a-n* utilizes a key derivation function 64 of the service-oriented architecture 14 to derive the secondary key 106, 106*a-n*. The primary key 104, 104*a-n* is also utilized by the secure environment 100, 100*a-n* to generate the MAC 32, 32*a-n* for the message 30, 30*a-n*. One or more of the devices 12, 12*a-n* may be in communication, and the MAC 32, 32*a-n* may be used in combination with the respective KSN 34, 34*a-n* to verify, by a receiving device 12, 12*a-n*, the message 30 generated by a transmitting device 12, 12*a-n*, described below.

The controller 20, 20*a-n* of the device 12, 12*a-n* may also include a high performance crypto accelerator (HPCA) 200, 200*a-n* that is executed by the data processing hardware 18, 18*a-n*. In some instances, the controller 20, 20*a-n* may not include an HPCA 200, 200*a-n*. In either configuration, the controller 20, 20*a-n* is configured to skip enforcement of a MAC generate allow list (MGAL) 112 when the message type 42 is a service event 50, described below. In some instances, the controller 20, 20*a-n* may selectively activate one of the secure environment 100, 100*a-n* and the HPCA 200, 200*a-n* depending on the message type 42. In other examples, the controller 20, 20*a-n* is configured to select either the secure environment 100, 100*a-n* or the HPCA 200, 200*a-n* to execute a service 24 based on the message type 42 of the received message 30. The service 24 is generating a MAC 32, 32*a-n* over the message 30, 30*a-n* using either the primary key 104, 104*a-n*, for service discovery 46 or RPCs 48, or the secondary key 106, 106*a-n*, for service events 50. For example, if the message type 42 includes either the service discovery 46 or the RPC 48, the controller 20, 20*a-n* executes the secure environment 100, 100*a-n*. The service discovery 46 is configured to set up the service-oriented architecture 14 with respect to the device, so each subsequent message having a service event 50 message type 42 may bypass the secure environment 100, 100*a-n*. Thus, service events 50 may be verified by the HPCA 200, 200*a-n*, rather than being processed through the secure environment 100, 100*a-n*.

Figure 3:
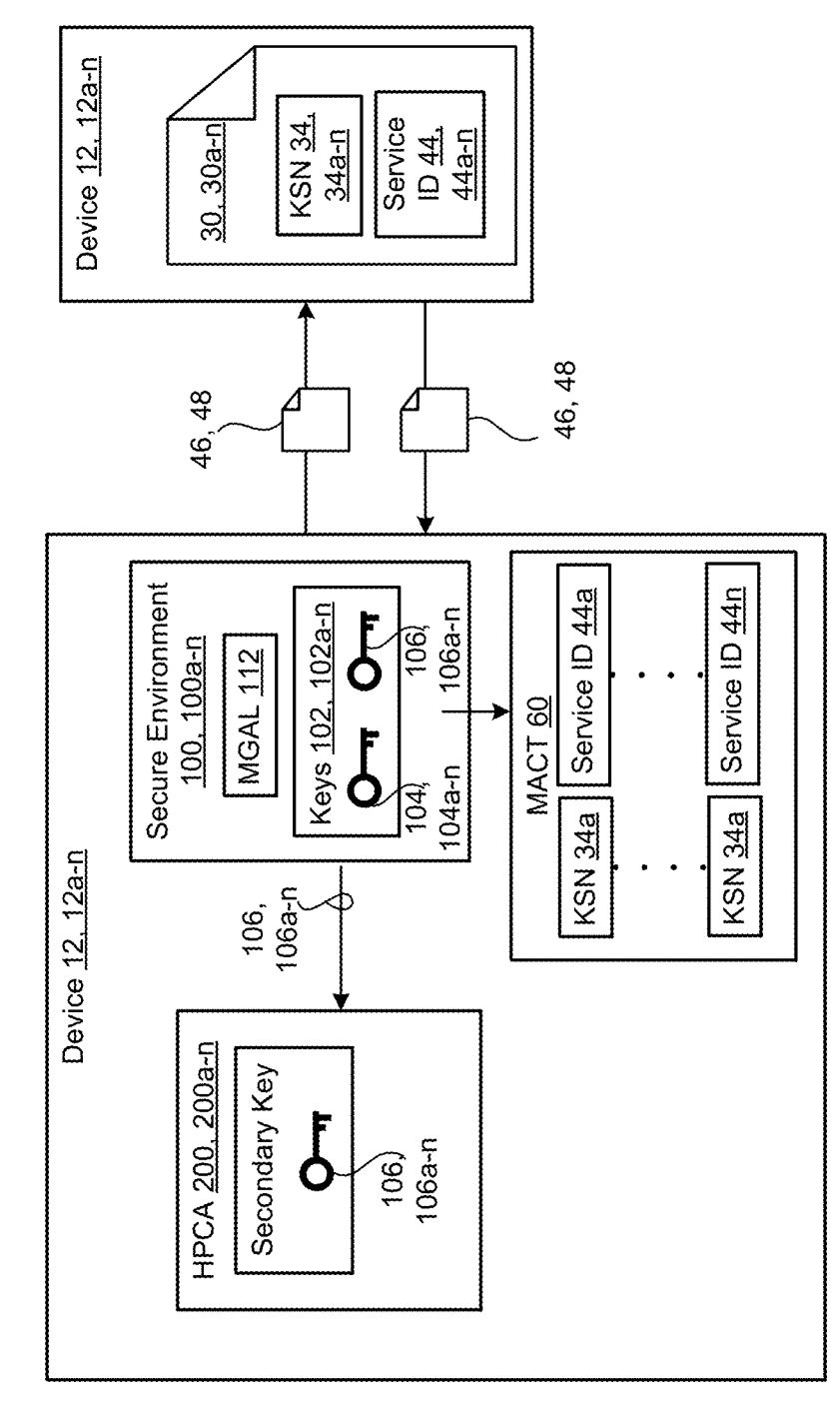
FIG. 3 is a schematic diagram of messages exchanged between devices of a secure message system according to the present disclosure.
Figure 4:
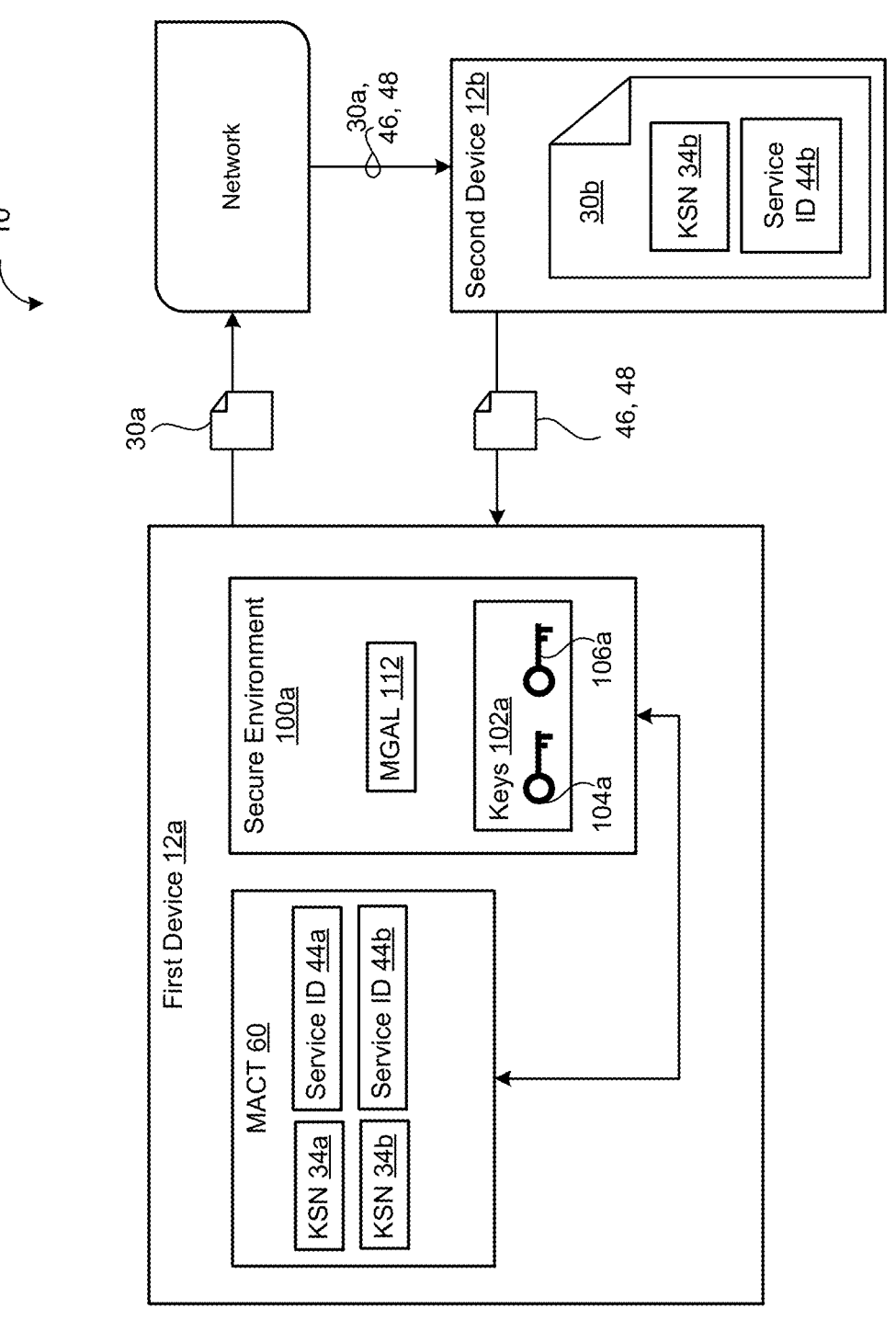
FIG. 4 is an exemplary schematic diagram of a service discovery between devices of a secure message system according to the present disclosure.
Figure 5:
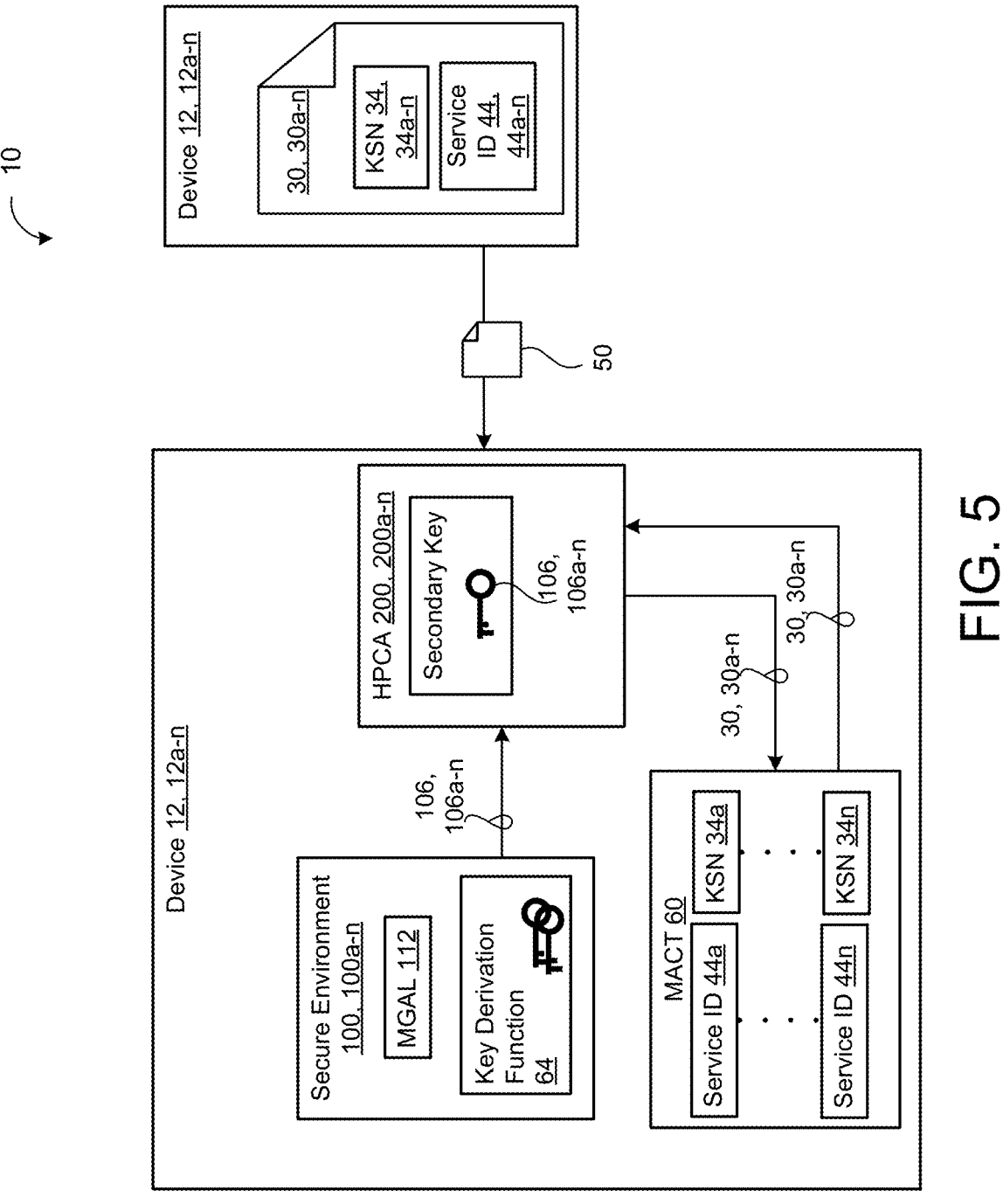
FIG. 5 is a schematic diagram of a message exchange between devices of a secure message system according to the present disclosure.

Referring to FIGS. 2-4, the process of executing a service discovery 46 is described. The secure environment 100, 100*a-n* is configured to determine if the device 12, 12*a-n* is permitted to transmit a message 30 by checking a MAC generate allow list (MGAL) 112 of the device 12, 12*a-n*. The MAC generate allow list (MGAL) 112 is utilized by the controller 20, 20*a-n* in combination with the primary key 104, 104*a-n* to determine if a MAC 32, 32*a-n* is allowed to be generated and provided to the controller 20, 20*a-n*. In order to ensure that other controllers 20, 20*a-n* cannot spoof each other, the secure environment 100, 100*a-n* utilizes the secret keys 102, 102*a-n* to restrict access to generation of a MAC 32, 32*a-n* by evaluating the message 30 with the MGAL 112. The process of comparing each message 30 with the MGAL 112 through the secure environment 100, 100*a-n* is time consuming and costly, such that it is advantageous to selectively bypass the secure environment 100, 100*a-n* and enforcement of the MGAL 112 and utilize the HPCA 200, 200*a-n*, described below. While the HPCA 200, 200*a-n* may be utilized to bypass the secure environment 100, 100*a-n*, it is also contemplated that the secure environment 100, 100*a-n* may be bypassed based on the message type 42 being a service event 50. For example, the controller 20, 20*a-n* may selectively bypass the MGAL 112 enforcement when the message type 32 is a service event 50, regardless of whether the controller 20, 20*a-n* is equipped with the HPCA 200, 200*a-n*.

The secure environment 100, 100*a-n* may be primarily utilized during execution of the service discovery 46 and/or RPCs 48, as the service discovery 46 and/or RPC 48 is the initial set-up of communication between the various controllers 20, 20*a-n*. For example, a first device 12*a* may send a message 30*a* having a message type 42 of service discovery 46, such that the first device 12*a* is seeking out another device 12, 12*b-n* capable of providing a particular service 24. The first device 12*a* subsequently receives back a message 30*b* from the second device 12*b* offering the service 24 and also having a message type 42 of service discovery 46. The second device 12*b* utilizes the secure environment 100*b* of the second device 12*b* to obtain a MAC 32*b* on the message 30*b* prior to transmitting the message 30*b* to the first device 12*a*. The secure environment 100*b* first assesses the MGAL 112 to determine if the device 12, 12*a-n* is authorized to offer the service 24, and if the service 24 is authorized, the secure environment 100*b* generates the MAC 32*b*. If the service 24 is not authorized, then the secure environment 100*b* sends back an error as part of the message 30. Upon receiving an authorized message 30*b*, the device 12, 12*a-n* utilizes the MACT 60 to determine which secret key 102, 102*a-n* should be used to verify the authenticity of the received message 30*b*.

Figure 6:
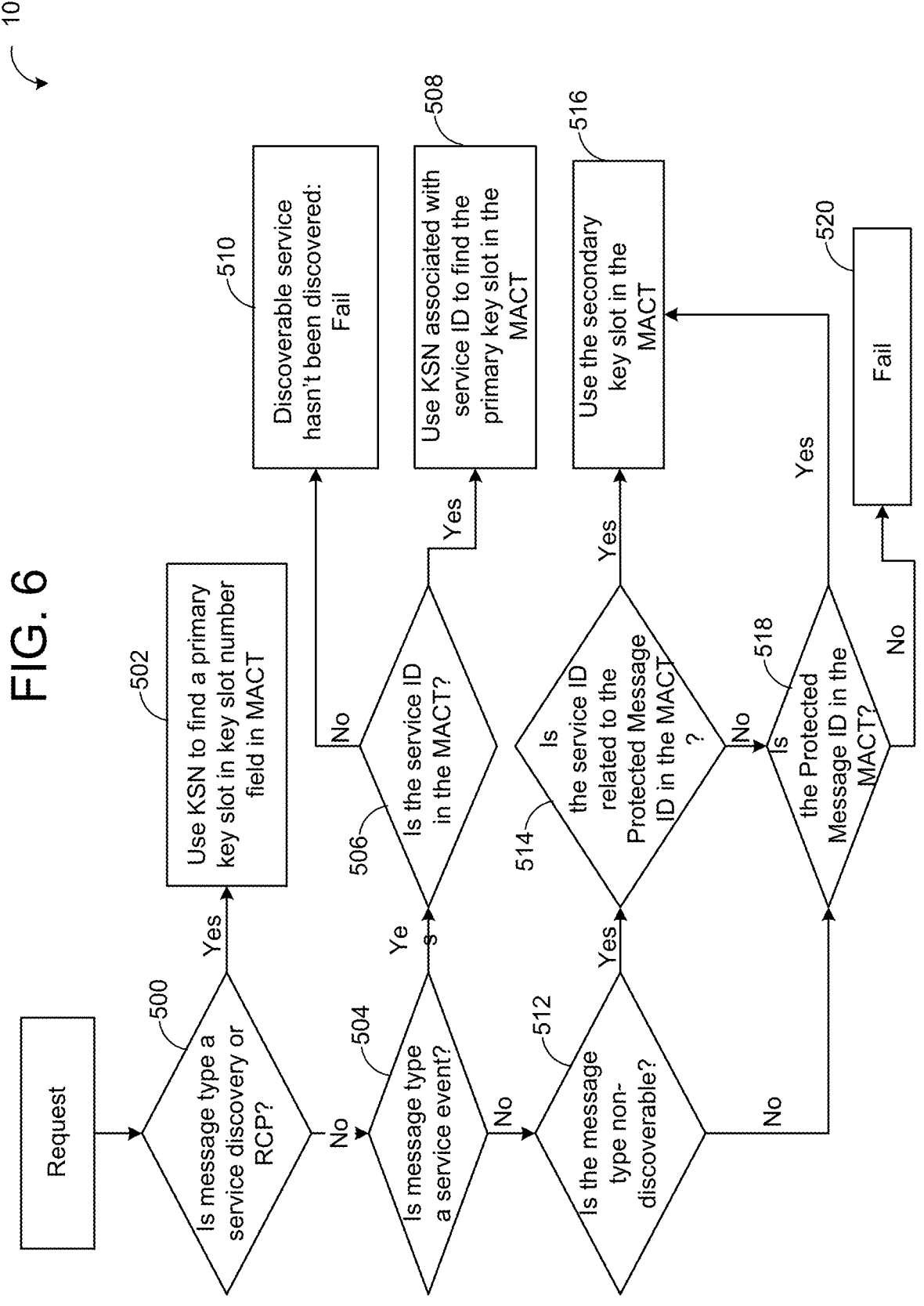
FIG. 6 is an exemplary flow diagram of a MAC request of a secure message system according to the present disclosure.

As illustrated in FIG. 6, the controller 20, 20*a-n* may receive a request related to the MAC 32, 32*a-n*. For example, the MAC 32, 32*a-n* may be verified and/or generated based on a series of steps dependent upon the message type 42 of the message 30, 30*a-n*. The controller 20, 20*a-n* determines, at 500, the message type 42. If the message type 42 is a service discovery 46 or RPC 48, then the controller 20, 20*a-n* uses the KSN 34, 34*a-n* to find the key slot 70 in a key slot number field 72 of the MACT 60. The key slot 70 holds the secret key 102, 102*a-n* that is used to verify the MAC 32, 32*a-n* of the received message 30, 30*a-n*. The controller 20, 20*a-n* determines which secret key 102, 102*a-n* (i.e., primary key 104, 104*a-n* or secondary key 106, 106*a-n*) to use to verify the MAC 32, 32*a-n* over the message 30, 30*a-n*. Thus, if the message type 42 is a service discovery 46 or RPC 48, then the controller 20, 20*a-n* uses, at 502, the KSN 34, 34*a-n* to find the primary key slot 70 in the key slot number field 72 of the MACT 60.

If the message type 42 is not a service discovery 46 or RPC 48, the controller 20, 20*a-n* determines, at 504, if the message type 42 is a service event 50. If the message type 42 is a service event 50, then the controller 20, 20*a-n* determines, at 506, whether the service ID 44, 44*a-n* in the message 30, 30*a-n* matches the service ID 44, 44*a-n* and/or KSN 34, 34*a-n* stored in the MACT 60. If there is a match, the controller 20, 20*a-n* uses, at 508, the KSN 34, 34*a-n* associated with the service ID 44, 44*a-n* to find the primary key slot 70 in the key slot number field 72 in the MACT 60. If there is not a match, then the controller 20, 20*a-n* issues, at 510, an error message corresponding to failure to either verify or generate.

If the message 30, 30*a-n* does not contain a service event 50 message type 42, then the controller 20, 20*a-n* determines, at 512, if the message 30, 30*a-n* which has message type 42 of a non-discoverable service event 50. The controller 20, 20*a-n* may define the service ID 44, 44*a-n* at the service level rather than based on the message type 42 if the service 24 offered in the message 30, 30*a-n* does not have a message type 42 corresponding to any of the service discovery 46, the RPC 48, or the service event 50. For example, the controller 20, 20*a-n* may determine whether the service ID 44, 44*a-n* is related to a message ID 84 in the MACT 60. If yes, then the controller 20, 20*a-n* uses the key slot 70 in the MACT 60. If not, then the controller 20, 20*a-n* determines, at 518, whether a protected message ID 80 is in the MACT 60. If the protected message ID 80 is in the MACT 60, then the controller 20, 20*a-n* may proceed to using the key slot 70 in the MACT 60. If not, then the controller 20, 20*a-n* fails, at 520, to verify or generate the MAC 32, 32*a-n*.

With further reference to FIGS. 2-6, each message 30, 30*a-n* includes a service ID 44, 44*a-n*, in addition to the message type 42, which is associated with the KSN 34, 34*a-n* of the respective device 12, 12*a-n*. The MACT 60 links the KSN 34, 34*a-n* of the transmitting device 12, 12*a-n* with the key slot 70 based on the service ID 44, 44*a-n* included in the message 30, 30*a-n*. For example, if the first device 12*a* receives at an authorized service discovery 46 message 30*b* from the second device 12*b*, a KSN/service ID table 82 associates the offered service 24 of the message 30*b* with the KSN 34*b* of the second device 12*b*. Each controller 20, 20*a-n* is configured with a MACT 60 that identifies a primary key slot associated with messages 30, 30*a-n* having a service discovery 46 message type 42. The MACT 60 may be separate from the secure environment 100, 100*a-n*, such that the HPCA 200, 200*a-n* may access and reference the MACT 60 during validation of messages 30.

Referring still to FIGS. 2-4, the MACT 60 links the KSNs 34, 34*a-n* with respective key slots 70 during service discovery 46, and each message 30, 30*a-n* during service discovery 46 utilizes the primary key 104, 104*a-n* of the transmitting device 12, 12*a-n* to generate the MAC 32, 32*a-n*. For example, during service discovery 46 a KSN/ service ID table 82 is generated by the controller 20, 20*a-n* outside of the secure environment 100, 100*a-n* to link each discovered service ID 44, 44*a-n* with the KSN 34, 34*a-n* of the device 12, 12*a-n* that offered the service. The messages 30, 30*a-n* each include the KSN 34, 34*a-n* of each device 12, 12*a-n* and the service ID 44, 44*a-n*, in addition to the MAC 32, 32*a-n*. The MACT 60 links the KSN 34, 34*a-n* with key slots 70 that are associated with the secret keys 102, 102*a-n* of the respective device 12, 12*a-n*. The key slots 70 are in the key slot number field 72 of the MACT 60, which is associated with one of the secure environment 100, 100*a-n* or the HPCA 200, 200*a-n*.

The secret key 102, 102*a-n* utilized may depend on the message type 42, such that the controller 20, 20*a-n* may determine which secret key 102, 102*a-n* to select based on the message type 42 and the key slot number field 72. The MACT 60 associates the key slots 70 with the KSN 34, 34*a-n* and the service ID 44, such that future MACs 32, 32*a-n* may be validated against the MACT 60 regardless of the message type 42. The location of the key slot 70 (i.e., in the secure environment 100, 100*a-n* or the HPCA 200, 200*a-n*) indicates which secret key 102, 102*a-n* to use when verifying the message 30, 30*a-n*. For example, if the key slot 70 is located in the secure environment 100, 100*a-n*, then the primary key 104, 104*a-n* is utilized to verify the message 30, 30*a-n*, and if the key slot 70 is located in the HPCA 200, 200*a-n*, then the secondary key 106, 106*a-n* is utilized to verify the message 30. The receiving devices 12, 12*a-n* typically utilize the HPCA 200, 200*a-n* for authenticating the messages 30, 30*a-n*, as enforcement of the MGAL 112 only occurs at the transmitting device 12, 12*a-n*.

Figure 7:
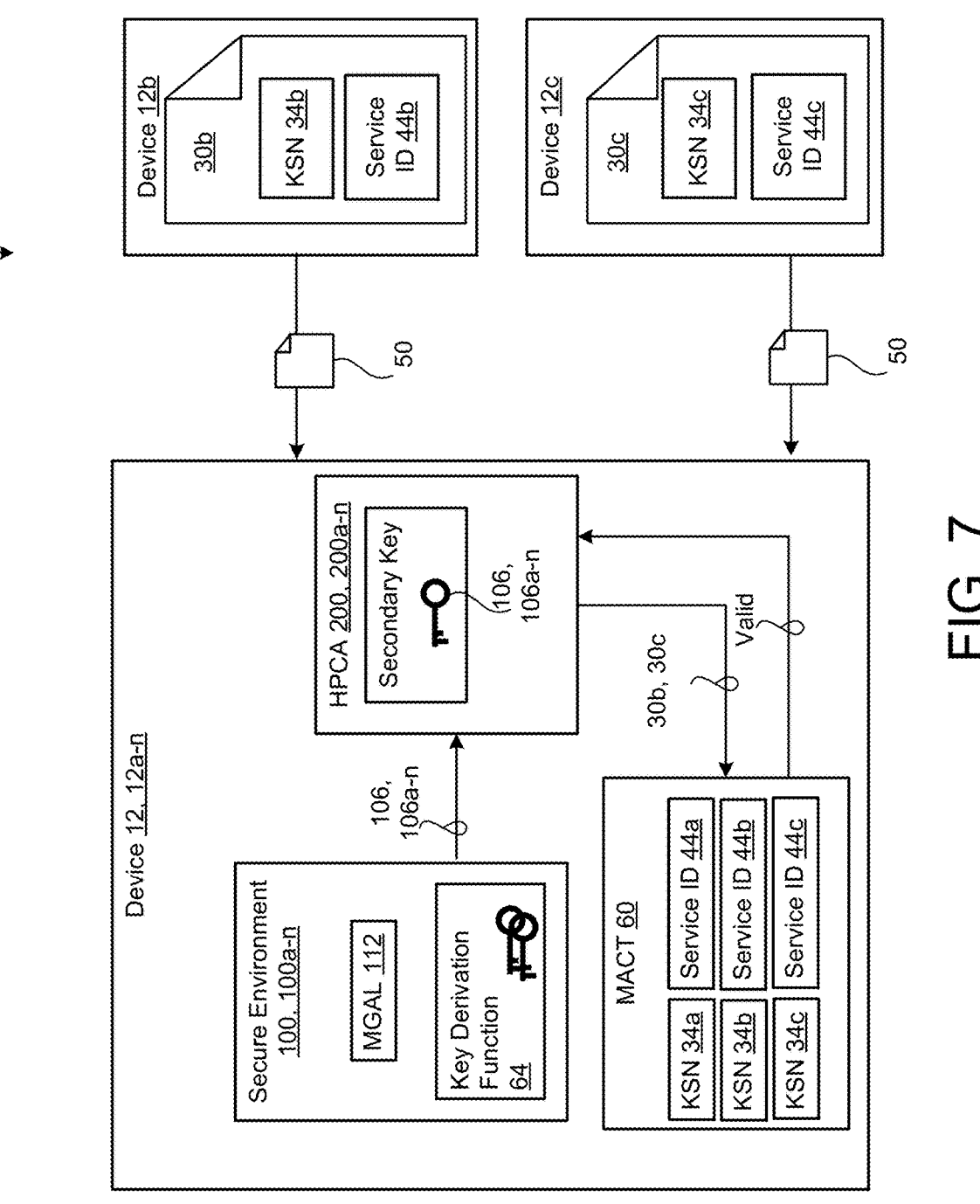
FIG. 7 is an exemplary schematic diagram of a service event between devices of a secure message system according to the present disclosure.
Figure 8:
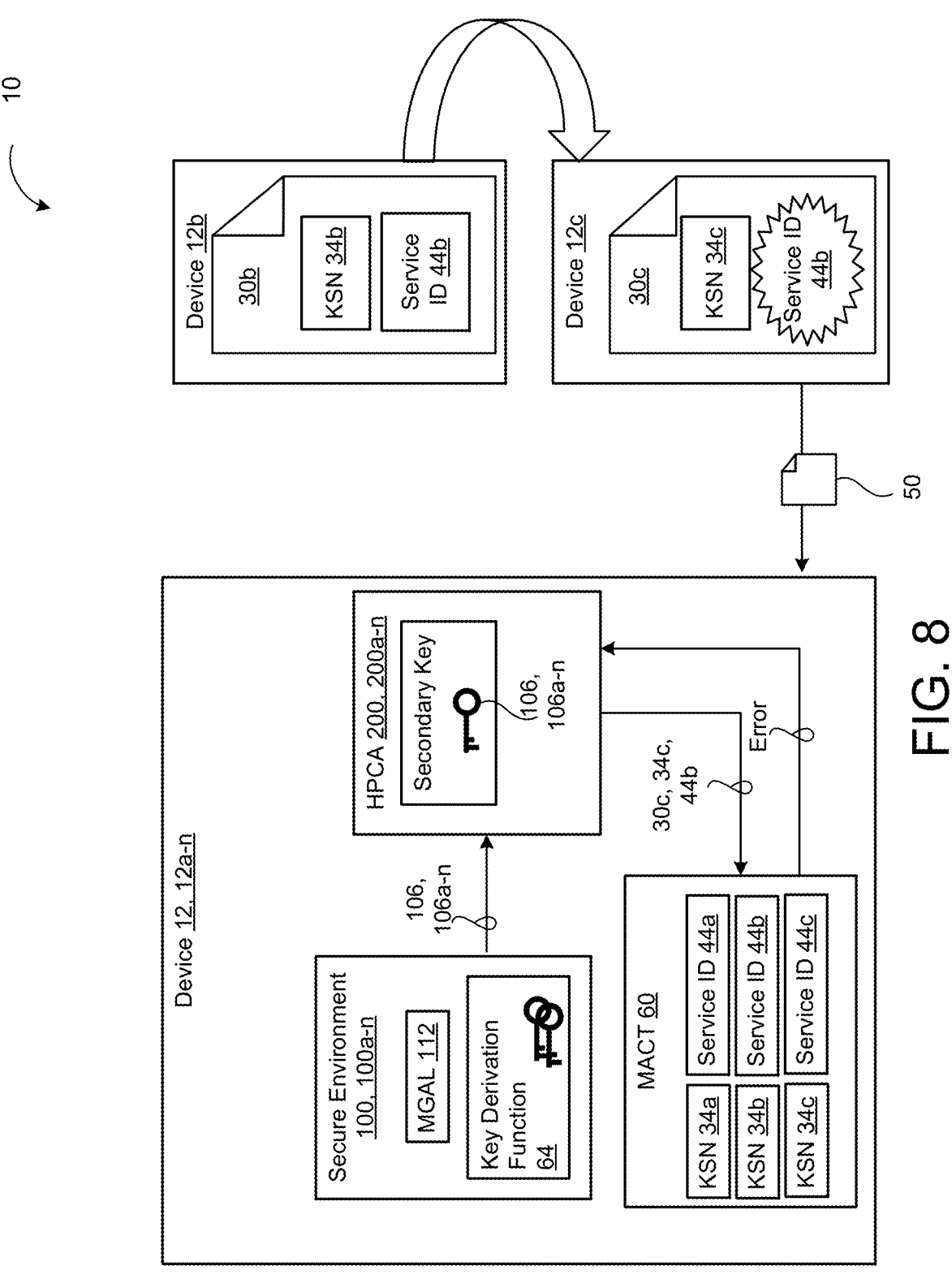
FIG. 8 is exemplary schematic diagram of a spoofed device during a service event between devices of a secure message system according to the present disclosure.

Referring now to FIGS. 2, 6 and 7, an example of the process of generating and receiving messages 30, 30*a-n* having a message type 42 of the service event 50 is described. Service events 50 include all messages 30, 30*a-n* published by a server after service discovery 46. Messages 30, 30*a-n* having a message type 42 including the service event 50 are executing services 24 that have been established and stored as part of the KSN/service ID table 82 of the receiving device 12, 12*a-n*. Thus, the controller 20, 20*a-n* of the transmitting device 12, 12*a-n* may utilize the HPCA 200, 200*a-n*, rather than the secure environment 100, 100*a-n*, to create MACs 32, 32*a-n* on service events 50 to be transmitted. In other examples, the controller 20, 20*a-n* may bypass the MGAL 112 and secure environment 100, 100*a-n* regardless of the utilization or configuration of the HPCA 200, 200*a-n*.

In one example, a first device 12*a* receives a message 30 from a second device 12*b* that has a message type 42 indicating a service event 50. The first device 12*a* utilizes the KSN/service ID table 82 to determine which KSN 34, 34*a-n* has been associated with the service ID 44, 44*a-n*. The MACT 60 is then used to look up the KSN 34, 34*a-n* in order to execute the HPCA 200*a* to look-up the service ID 44 and the KSN 34*b* in the MACT 60 to identify the secret key 102*b* that should be used to verify the message 30*b*. In doing so, the first controller 20*a* identifies the key slot 70 based on the KSN 34*b*, and obtains the secret key 102*b* associated with the key slot 70. Each device 12, 12*a-n* is only able to generate a MAC 32, 32*a-n* with the secret key 102, 102*a-n* associated with the KSN 34, 34*a-n* of that respective device 12, 12*a-n*. Thus, a compromised device 12, 12*a-n* is prevented from publishing unauthorized service events 50, as each device 12, 12*a-n* has the respective KSN 34, 34*a-n* of the device 12, 12*a-n* associated with an authorized service 24 (i.e., the service ID 44), which is further verified by the secret keys 102, 102*a-n*.

FIG. 7 illustrates an example of three devices 12, 12*a-c*, where one of the devices 12, 12*a-c* is compromised. A first device 12*a* is the receiving device 12*a*, and a second device 12*b* and a third device 12*c* are in communication with the first device 12*a*. The first device 12*a* stores the second KSN 34*b* and the second service ID 44*b* of the second device 12*b* and the third KSN 34*c* and the third service ID 44*c* of the third device 12*c*, such that both the second and third devices 12*b*, 12*c* have previously gone through service discovery 46 with the first device 12*a*. The third device 12*c* is compromised and attempts to spoof the second device 12*b*. The third device 12*c* sends a message 30*c* including a second MAC 32*b*. Because the message 30*c* is sent by the compromised third device 12*c*, the message 30*c* contains a MAC 32*c* generated with the secret key 102*c* linked to the third KSN 34*c* despite using the spoofed, second service ID 44*b*. The compromised third device 12*c* attempts to spoof a message 30*b* from the second device 12*b* by including the second KSN 34*b* and the second service ID 44*b*, associated with the second device 12*b*, as part of the service event 50 of the message 30*c*. However, the third device 12*c* has to use the secret key 102*c* associated with third KSN 34*c*, as each device 12, 12*a-n* can only use the secret key 102, 102*a-n* associated with the KSN 34, 34*a-n* that is initially configured with that respective device 12, 12*a-n*.

The first device 12*a* receives the message 30*b* including the second KSN 34*b*, the second service ID 44*b*, and a MAC 32*c* created with the secret key 102*c* associated with the third KSN 34*c*. The first device 12*a* looks up (i.e., via the HPCA 200*a* or controller 20*a*) the service ID 44*b* in the KSN/service ID table 82 and finds the KSN 34*b* associated with the service ID 44*b* in order to determine from the MACT 60 which secret key 102, 102*a-n* to use to verify the MAC 32*c* of the message 30*b*. The verification of the MACT 60 will fail due to the secret key 102*b* of the second device 12*b* being associated with the service ID 44*b*. Thus, the compromised third device 12*c* is not permitted to send service events 50 for the offered service 24, as the message 30*b* was determined to be invalid. Even if the third device 12*c* transmitted a message 30*b* containing the second KSN 34*b*, then the MAC 32*b* would fail, as the third device 12*c* does not have access or privileges to access the secret keys 102*b* of the second device 12*b*. As mentioned above, the KSN 34, 34*a-n* and the service ID 44, 44*a-n* are used to identify the key slot 70, which is subsequently used to have the secret key 102, 102*a-n* provided. The receiving device 12, 12*a-n* of the message does not have the ability to use the secret keys 102, 102*a-n* of other devices 12, 12*a-n* to generate MACs 32, 32*a-n*. Rather, the secret keys 102, 102*a-n* are only able to be used to authenticate the message 30, 30*a-n*.

Referring again to FIGS. 2-7, a single secret key 102, 102*a-n* is provisioned for each device 12, 12*a-n*, and the key derivation function 64 is utilized to generate the secondary key 106, 106*a-n* for use by the HPCA 200, 200*a-n*, or secure environment 100, 100*a-n* if an HPCA 200, 200*a-n* is not available, when executing service events 50. Thus, when a device 12, 12*a-n* receives a service discovery 46 message 30, 30*a-n*, the controller 20, 20*a-n* knows to use the primary key 104, 104*a-n*, and the controller 20, 20*a-n* knows to use the secondary key 106, 106*a-n* when the device 12, 12*a-n* receives a service event 50 message 30.

FIG. 9 includes a flowchart of an example arrangement of operations for a method 900 for a secure message system 10. At 902, the controller 20, 20*a-n* of a first device 12, 12*a-n* generates a message 30, 30*a-n* having a header 40 that includes a message type 42 and a service identifier (ID) 44, 44*a-n*. The message type 42 is one of a service discovery 46 and a service event 50. At 904, a second device 12, 12*a-n* receives the message 30, 30*a-n* that includes the header 40 and a KSN 34, 34*a-n* of the first device 12, 12*a-n*. The controller 20, 20*a-n* determines, at 906, the message type 42 of the message 30, 30*a-n* based on the header 40. A HPCA 200, 200*a-n* of the second device 12, 12*a-n* verifies, at 908, the MAC 32, 32*a-n* of the message 30, 30*a-n* based on the determined message type 42 being the service event 50.

The KSN/service ID table 82 is used to find the KSN 34, 34a-n associated with the service ID 44, 44a-n that was stored when the service 24 was discovered. A key slot 70 is then obtained, at 910, from a MACT 60 based on the KSN 34, 34a-n from the message 30, 30a-n. A secret key 102, 102a-n is identified, at 912, based on the key slot 70 and is used to verify the message 30. The secret key 102, 102a-n is associated with the key slot 70 and includes at least one of a primary key 104, 104a-n and a secondary key 106, 106a-n. Finally, the MAC 32, 32a-n is verified, at 914, using the secret key 102, 102a-n and the key slot 70 obtained from the MACT 60.

Referring again to FIGS. 1-9, the secure message system 10 advantageously secures messages exchanged between devices 12, 12a-n. For example, a vehicle 16 equipped with a plurality of devices 12, 12a-n may be configured with the secure message system 10 to secure messages 30, 30a-n exchanged between the devices 12, 12a-n. Each device 12, 12a-n is configured as part of the service-oriented architecture 14 to prevent devices 12, 12a-n from offering services 24, publishing service events 50, and sending RPCs 48 that are not part of the authorized functions of the device 12, 12a-n. The service-oriented architecture 14 advantageously utilizes the KSN 34, 34a-n pre-programmed with each device 12, 12a-n in combination with the service ID 44, 44a-n, the MACT 60, the secret keys 102, 102a-n, and the key slot 70 to generate and verify MACs 32, 32a-n. The device 12, 12a-n requires the verified MAC 32, 32a-n prior to executing any service 24, such that the cross-reference of the KSN 34, 34a-n and service ID 44, 44a-n at the KSN/ service ID table 82 and the MACT 60 prevents unauthorized services 24 from being executed.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed by data processing hardware causes the data processing hardware to perform operations comprising:

generating, at a first device, a message having a header including a message type and a service identifier (ID), the message type being one of a service discovery and a service event;

receiving, at a secure environment of a second device, the message including the header and a key serial number (KSN) of the first device;

generating, outside of a secure environment of the first device, a KSN/service ID table including storing the KSN and the service ID from the message;

determining, based on the header, the message type of the message;

verifying, at a high performance crypto accelerator (HPCA) of the second device, a message authentication code (MAC) of the message based on the determined message type being the service event;

obtaining, based on the KSN from the message, a key slot from a message authentication code table (MACT);

identifying, based on the key slot, a key associated with the key slot obtained from the MACT, the key including at least one of a primary key and a secondary key; and verifying, using the key and the key slot obtained from the MACT, the MAC.

2. The method of claim 1, wherein determining the message type includes determining that the message type is a service discovery.

3. The method of claim 1, wherein generating the KSN/ service ID table includes associating an offered service of the message with the KSN of the second device.

4. The method of claim 3, wherein verifying the MAC includes determining an error based on the KSN from the message and the stored service ID at the KSN/service ID table.

5. The method of claim 4, wherein determining the error includes issuing an error message and terminating the service event.

6. The method of claim 1, wherein identifying the key includes executing a key derivation function and generating the secondary key.

7. A computer-implemented method when executed by data processing hardware causes the data processing hardware to perform operations comprising:

generating, at a first device, a message having a header including a message type and a service identifier (ID), the message type being one of a service discovery and a service event;

receiving, at a secure environment of a second device, the message including the header and a key serial number (KSN) of the first device;

generating, outside of a secure environment of the first device, a KSN/service ID table including storing the KSN and the service ID from the message;

determining, based on the header, the message type of the message;

bypassing, based on the determined message type being the service event, a message authentication code (MAC) generate allow list (MGAL);

comparing, based on the KSN from the message, the service ID from the message with a stored service ID from a message authentication code table (MACT);

validating, based on the service ID matching the stored service ID, the KSN at the MACT;

obtaining, based on the validated KSN, a key slot from the MACT;

identifying, based on the key slot, a key associated with the key slot obtained from the MACT, the key including at least one of a primary key and a secondary key; and verifying, using the key and the key slot obtained from the MACT, the MAC.

8. The method of claim 7, wherein determining the message type includes determining that the message type is a service discovery.

9. The method of claim 7, wherein generating the KSN/ service ID table includes associating an offered service of the message with the KSN of the second device.

10. The method of claim 9, wherein verifying the MAC includes determining an error based on the KSN from the message and the stored service ID at the KSN/service ID table and issuing an error message and terminating the service event.

11. The method of claim 10, wherein bypassing the MGAL includes verifying, by a high performance crypto accelerator (HPCA), the service event.

12. The method of claim 7, wherein identifying the key includes executing a key derivation function and generating the secondary key.

13. A secure message system for a vehicle, the secure message system comprising:

data processing hardware; and memory hardware in communication with the data processing hardware, the memory hardware storing instructions that when executed on the data processing hardware cause the data processing hardware to perform operations comprising:

generating, at a first device, a message having a header including a message type and a service identifier (ID), the message type being one of a service discovery and a service event;

receiving, at a secure environment of a second device, the message including the header and a key serial number (KSN) of the first device;

generating, outside of a secure environment of the first device, a KSN/service ID table including storing the KSN and the service ID from the message;

determining, based on the header, the message type of the message;

verifying, at a high performance crypto accelerator (HPCA) of the second device, a message authentication code (MAC) of the message based on the determined message type being the service event;

obtaining, based on the KSN from the message, a key slot from a message authentication code table (MACT);

identifying, based on the key slot, a key associated with the key slot obtained from the MACT, the key including at least one of a primary key and a secondary key; and verifying, using the key and the key slot obtained from the MACT, the message authentication code (MAC).

14. The secure message system of claim 13, wherein determining the message type includes determining that the message type is a service discovery.

15. The secure message system of claim 13, wherein generating the KSN/service ID table includes associating an offered service of the message with the KSN of the second device.

16. The secure message system of claim 15, wherein verifying the MAC includes determining an error based on the KSN from the message and the stored service ID at the KSN/service ID table.

17. The secure message system of claim 16, wherein determining the error includes issuing an error message and terminating the service event.

18. The secure message system of claim 13, wherein identifying the key includes executing a key derivation function and generating the secondary key.

\* \* \* \* \*